Oct. 1, 1963
L. JOHNS ETAL
3,105,473
SPHERICAL BALL ROTARY LIQUID SEALED INTERNAL
COMBUSTION ENGINE
Filed Sept. 6, 1960
4 Sheets-Sheet 1
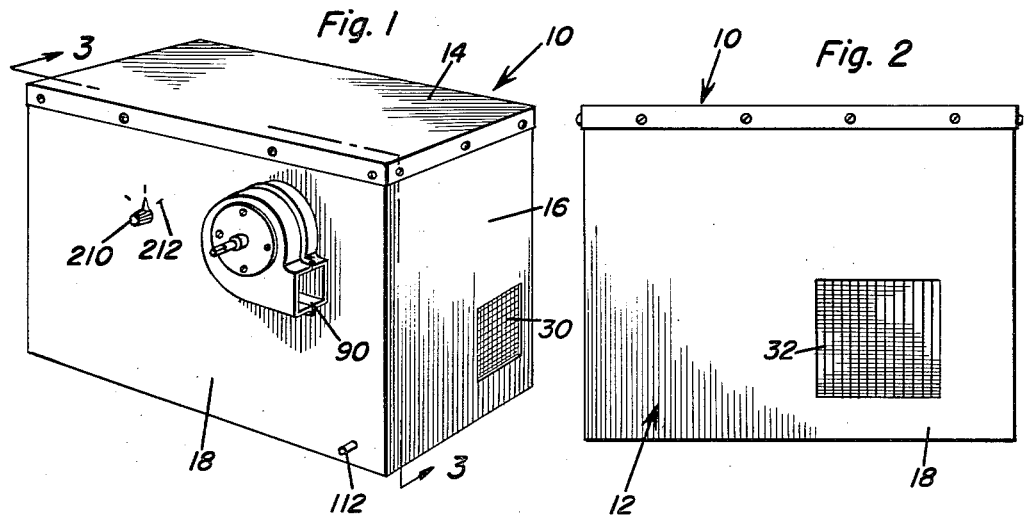
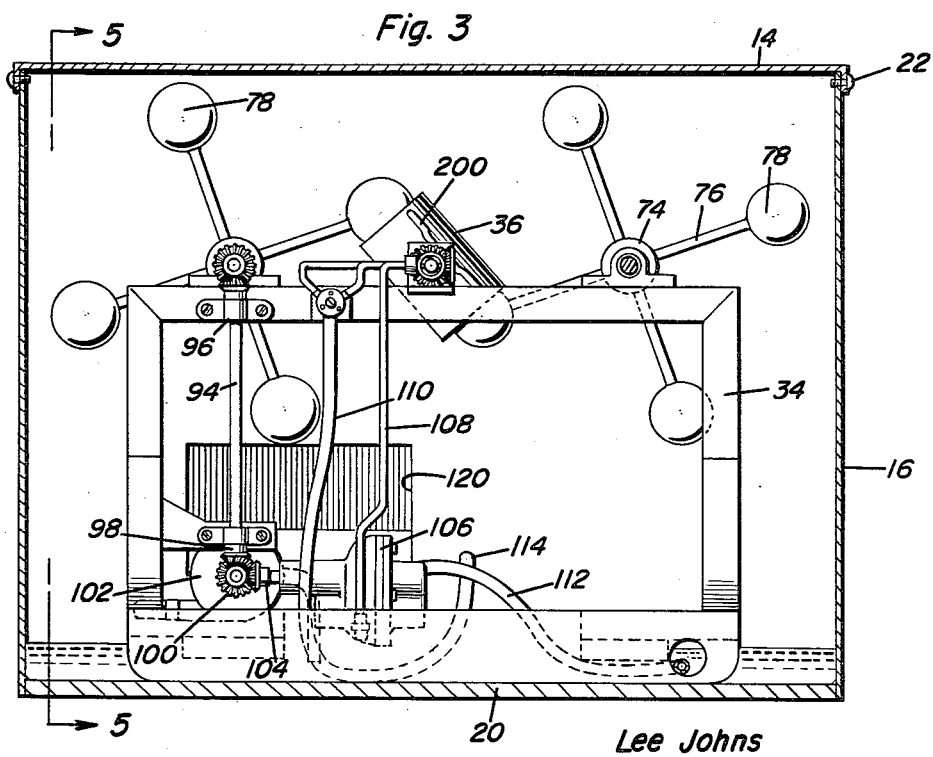
Lee Johns
Sherwood W. Whitney
INVENTORS
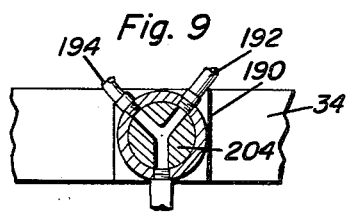
BY Clarence A. O'Brien
and Harvey B. Jacobson
Attorneys Oct. 1, 1963

L. JOHNS ETAL 3,105,473

SPHERICAL BALL ROTARY LIQUID SEALED INTERNAL
COMBUSTION ENGINE

Filed Sept. 6, 1960

Lee Johns
Sherwood W. Whitney
INVENTORS

BY *Clarence A. O'Brien*
and *Harvey B. Jacobson*
Attorneys

Oct. 1, 1963         L. JOHNS ETAL                3,105,473
       SPHERICAL BALL ROTARY LIQUID SEALED INTERNAL
                  COMBUSTION ENGINE
Filed Sept. 6, 1960                        4 Sheets-Sheet 3
Fig. 6
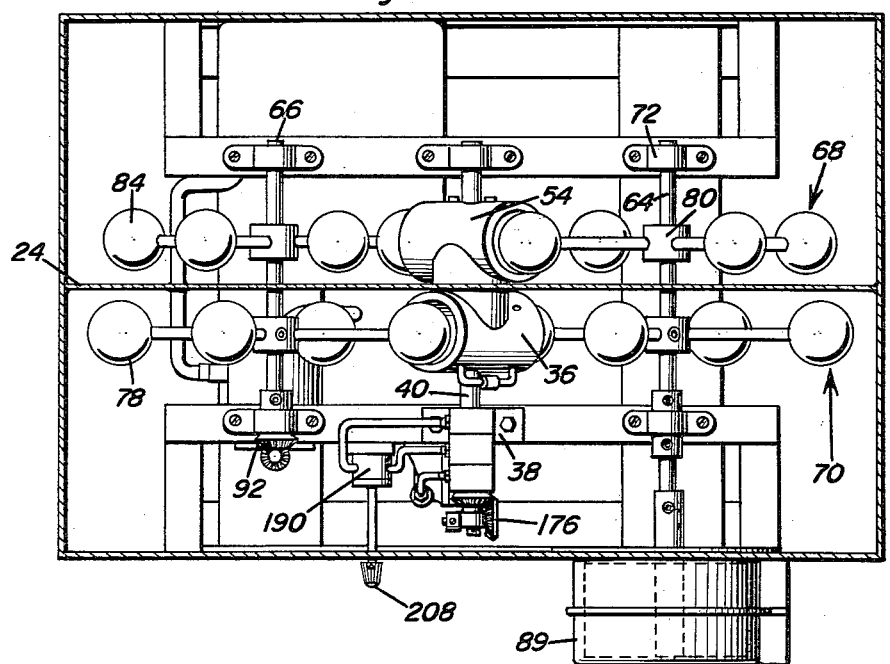
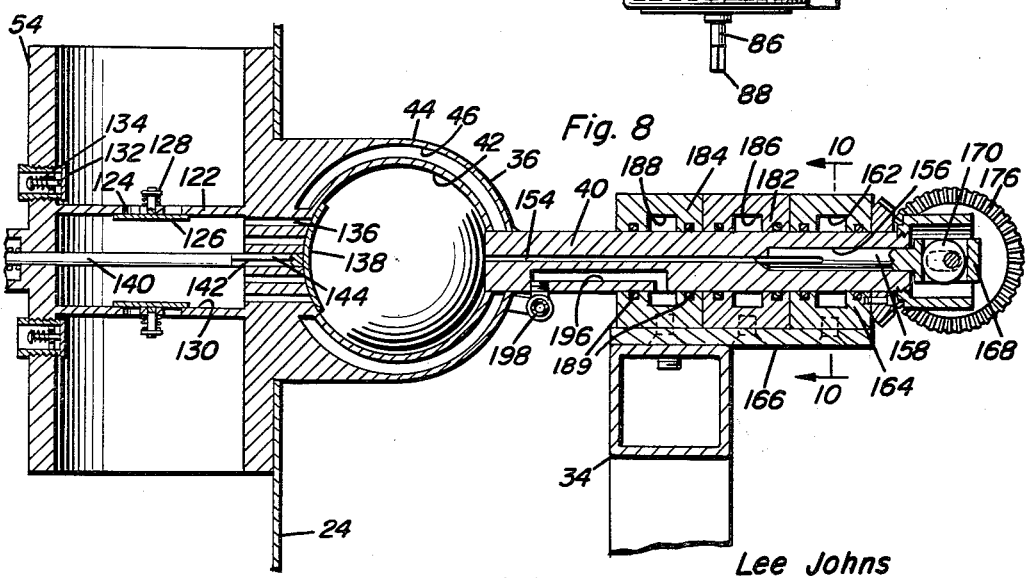
Fig. 10
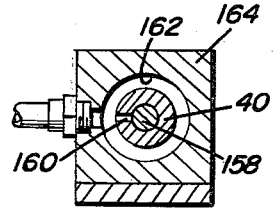
Lee Johns
Sherwood W. Whitney
  INVENTORS

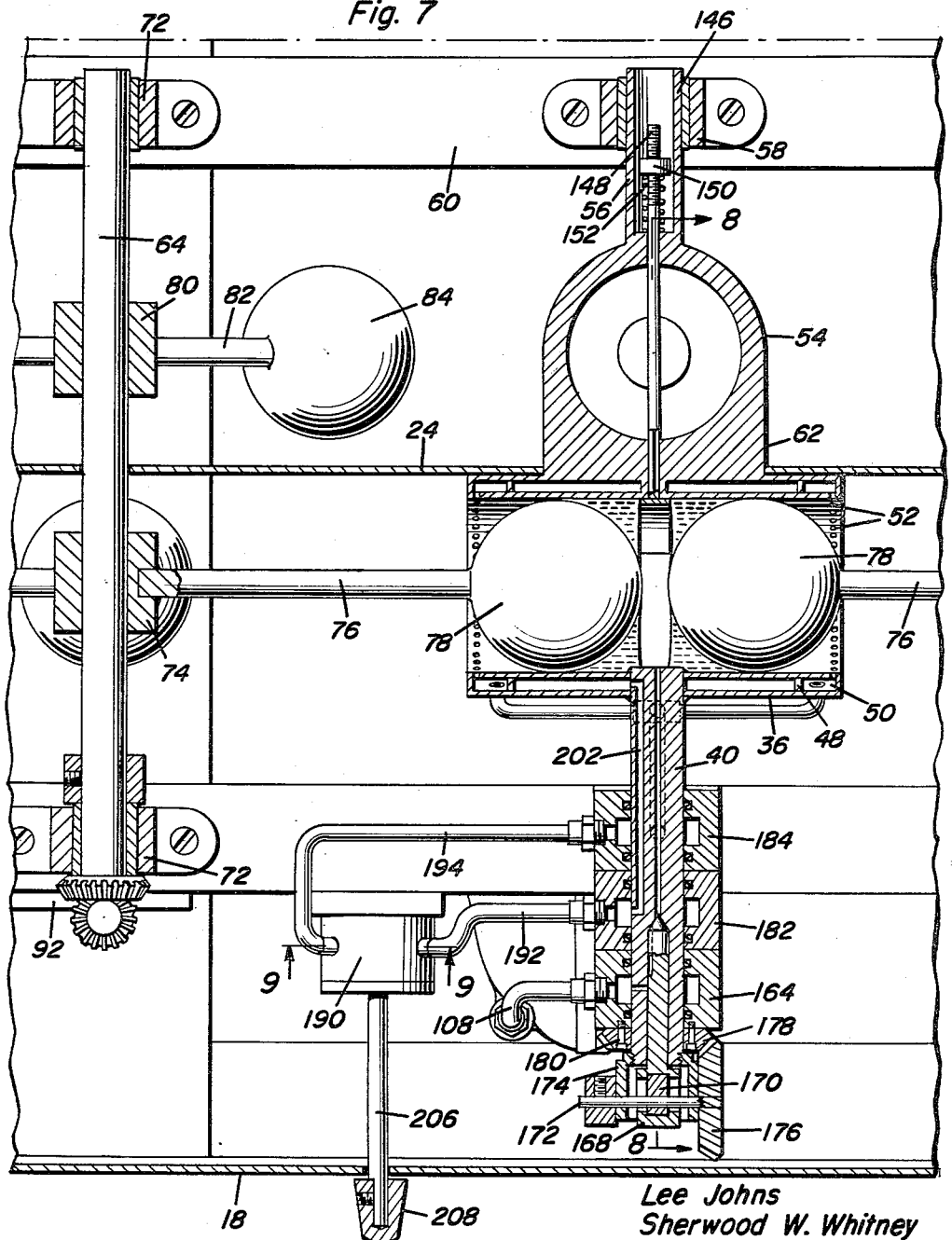

United States Patent Office 3,105,473
Patented Oct. 1, 1963

3,105,473
SPHERICAL BALL ROTARY LIQUID SEALED
INTERNAL COMBUSTION ENGINE
Lee Johns, Miami, and Sherwood W. Whitney, Okee-
chobee, Fla.; Guy Peebles, executor of said Lee Johns,
deceased, assignor to Minnie B. Johns, Miami, Fla.
Filed Sept. 6, 1960, Ser. No. 54,292
14 Claims. (Cl. 123—41.72)

The present invention generally relates to a power device and more particularly to an internal combustion engine incorporating novel structural features which operate on an entirely different principle of operation from conventional reciprocating piston type internal combustion engines.

The primary object of the present invention is to provide an internal combustion engine incorporating in its construction a rotatable open ended cylinder supported for rotation on a centrally disposed transverse axis together with a pair of rotatable ball assemblies disposed radially outwardly of each end of the cylinder whereby spherical balls enter and leave from the outer ends of the cylinder and cooperate to form a working chamber between the balls while they are in the cylinder thereby enabling forces of combustion taking place interior of the cylinder to be exerted on the balls to force them out of the ends of the cylinder and causing them to rotate about an axis of rotation.

Another very important object of the present invention is to provide an internal combustion engine of the character described having a novel means for sealing the spherical balls in relation to the cylinder which substantially completely eliminates friction between the balls and the cylinder such as normally occurs between piston rings and a cylinder wall and further serves to seal the balls in relation to the cylinder and form substantially a flat surface for reception of the forces of the expanding combustion products. The sealant is a non-combustible liquid and by controlling the quantity of sealant discharged into the cylinder immediately inwardly of the balls, the compression ratio of the engine may be easily adjusted which, of course, will vary the output of the engine.

Still another very important feature is the provision of an internal combustion engine as described in the preceding paragraph together with a scavenging assembly substantially duplicative of the power assembly and communicated therewith for compressing combustion supporting air and discharging the combustion supporting air into the working cylinder at the proper intervals. The ball assemblies incorporated into the scavenging assembly and the cylinder of the scavenging assembly are disposed in staggered relation to the components of the power assembly whereby the scavenging assembly actually serves to orientate the cylinders and balls of the power assembly in proper relation. At least two balls are disposed in a cylinder at all times thereby maintaining the cylinders in properly timed relation to the balls.

Yet another important feature of the present invention is to provide an internal combustion engine involving all rotary components rather than reciprocating components thereby substantially eliminating vibration caused by reciprocating components and producing a more effective transmission of the power from the pistons to the power shaft since the direction of application of force is always in alignment with the rod which connects the pistons to the power shaft, whereas a conventional reciprocating engine has the line of power of the piston offset in relation to the connecting rod during rotation of the crankshaft. This arrangement also eliminates the reduction in efficiency caused by the necessity of bringing the reciprocating piston of a conventional engine to a complete stop at the top and bottom dead centers of its stroke.

The present invention also eliminates specific timing gears in that the scavenging assembly also serves as a means for retaining the balls or pistons in proper orientation in relation to the cylinders.

While the present invention has been specifically disclosed as an internal combustion engine, it is also within the purview of the present invention for the structure to be employed for various other purposes such as a pump for various types of fluids, an air compressor, an internal combustion engine employing an ignition device and a relatively low compression ratio or as an engine employing a relatively high compression ratio as disclosed whereby ignition is accomplished by the heat of compression.

A still further object of the present invention is to provide an internal combustion engine incorporating a sealing fluid and a cooling fluid both of which are the same non-combustible material and which are discharged to a sump and then passed through a heat exchange radiator for cooling thereof. The entire assembly is disposed within a casing together with fan means provided for circulating air through the heat exchange radiator and discharging heated air from the casing and at the same time discharging exhaust products which have been blown out of the open end of the power cylinder.

A very important feature of the present invention is the provision of an internal combustion engine having a very minimum of moving parts, a minimum of friction and wear, a simple structural arrangement which is long lasting and rugged and the entire assembly is relatively inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the internal combustion engine of the present invention taken from the power side thereof;

FIGURE 2 is a side elevational view of the other side of the engine;

FIGURE 3 is a detailed sectional view taken substantially upon a plane passing along section line 3—3 of FIGURE 1 illustrating the orentation of the power side of the engine;

FIGURE 6 is a plan view of the engine with the top of the casing removed illustrating further structural details thereof and relationship of the components of the engine;

FIGURE 7 is an enlarged sectional view extending through the cylinder assembly and partially through one of the ball assemblies and illustrating the details of construction of the fuel supplying mechanism and the mechanism for controlling the flow of coolant and sealant;

FIGURE 8 is a detailed sectional view illustrating further details of the scavenging cylinder.

FIGURE 9 is a detailed sectional view taken substantially upon a plane passing along section line 9—9 of FIGURE 7 illustrating the three-way control valve for metering the sealing liquid; and FIGURE 10 is a detailed sectional view taken substantially upon a plane passing along section line 10—10 of FIGURE 8 illustrating further structural details of the fuel pump mechanism.

Figure 4:
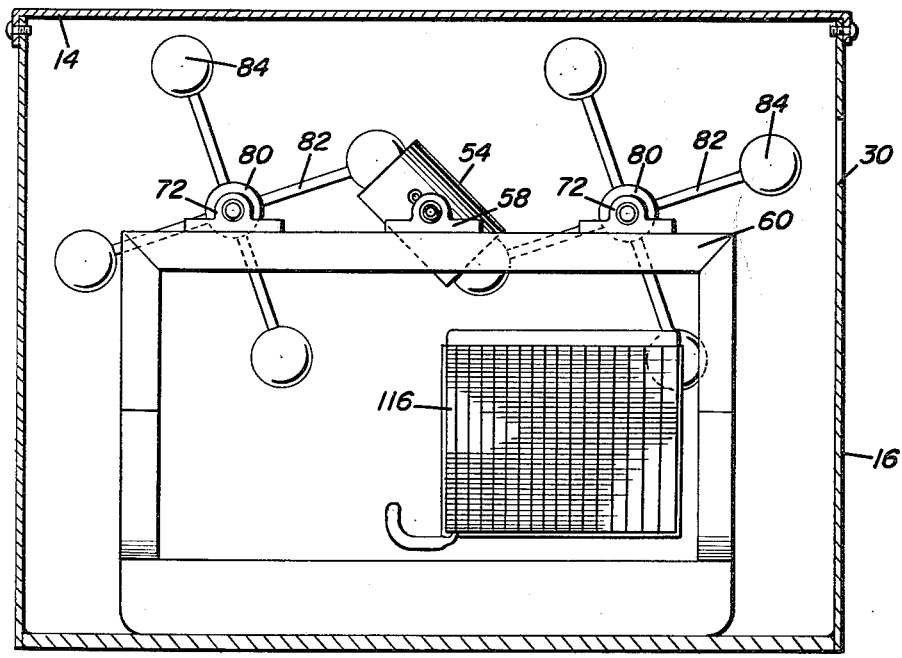
FIGURE 4 is a detailed sectional view similar to FIGURE 3 but taken from the scavenging side of the engine.
Figure 5:
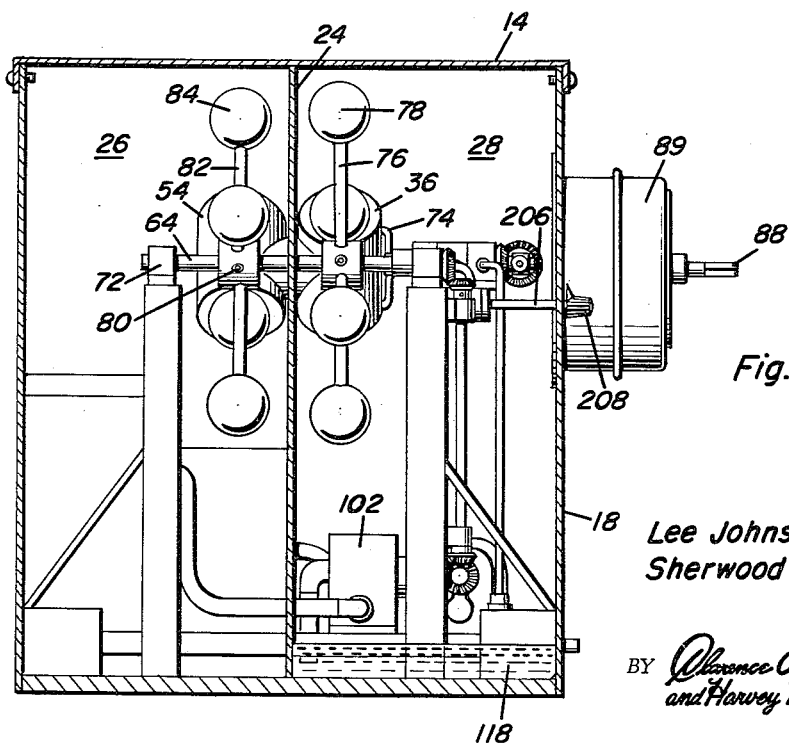
FIGURE 5 is a transverse, sectional view taken substantially upon a plane passing along section line 5—5 of FIGURE 3 illustrating the relationship of the power and scavenging sides of the engine.

Referring now specifically to the drawings, the numeral 10 generally designates the internal combustion engine of the present invention which for the purposes of illustration has been enclosed in a suitable casing generally designated by numeral 12 which is generally parallelepiped in configuration but which may take any suitable shape as required for a particular installation. The casing 12 includes a removable top 14, end walls 16, side walls 18 and a bottom 20. The top 14 is removable and retained in sealed relation by any suitable fastening means 22.

Disposed interiorly of the casing 12 and dividing the casing into two separate compartments is a partition 24 which extends completely throughout the vertical area of the casing and separates the casing into a scavenging compartment 26 and a power compartment 28. One end wall 16 of the scavenging compartment 26 is provided with an opening 30 for admitting combustion supporting air into the scavenging compartment. Also, the scavenging compartment 26 is provided with an inlet opening 32 adjacent the bottom thereof for admitting cooling air into the bottom of the compartment which is separated from the other regions of the scavenging compartment 26 by virtue of suitable partitions. In effect, the cooling air is funneled through the scavenging compartment into the power compartment 28.

Referring now specifically to FIGURE 3, the power compartment 28 is provided with an upstanding rigid and generally rectangular frame 34 having an open ended power cylinder 36 mounted thereon by virtue of bearing blocks 38 supporting a hollow shaft 40 for rotation on the axis of shaft 40.

The power cylinder 36 has a constant internal diameter designated by numeral 42 and is provided with an exterior jacket 44 thus defining a cooling passageway 46 for passage of a coolant in a manner described hereinafter. Also, the power cylinder 36 is provided with a peripheral partition 48 which forms a closure for the cooling jacket 46 and is communicated with a pressurized sealing liquid. The partitions 48 define compartments 50 around each end of the cylinder and the compartments 50 are communicated with the interior of the cylinder by virtue of a plurality of circumferentially spaced apertures 52 which permit injection of sealing liquid at each end of the cylinder in a predetermined timed relationship as described hereinafter.

Rigid with the cylinder 36 and rotatable on the axis of shaft 40 is a scavenging cylinder 54 arranged in perpendicular relation to the cylinder 36. The scavenging cylinder 54 is rotatably supported by virtue of a hollow shaft 56 on a bearing block 58 or the like. The bearing block 58 is supported on a frame 60 in the scavenging compartment 26 whereby the cylinders 36 and 54 will rotate in unison with each other and on an axis extending transversely of the cylinders adjacent the center thereof. The block or juncture between the cylinders 36 and 54 may be circular for extending through an aperture 62 in the partition 24.

Mounted parallel to the axis of rotation of the cylinder is a pair of shafts 64 and 66 each of which carries a scavenging ball assembly 68 thereon and a power ball assembly 70. The ball assemblies 68 and 70 are rigid with the shaft 64 or 66 respectively and the shafts 64 and 66 are journaled on the frame members by virtue of bearing blocks 72.

Each of the power ball assemblies 70 includes a hub 74 rigidly connected to the shaft 64 and a plurality of radially extending arms 76. Each arm 76 includes a spherical ball 78 on the outer end thereof which is of metallic construction and provided with a precision ground external surface. There are four arms 76 and four balls 78 in each assembly and these are orientated equally about the center of the shaft 64.

Each scavenging ball assembly 68 includes a centrally disposed hub 80 and four radially extending arms 82 with each arm 82 having a spherical ball 84 rigid with the outer end thereof.

One of the shafts 64 which may be considered the forward shaft is provided with an extension 86 which may be provided with a power take-off device such as a polygonal end 88 for utilizing power from the engine for any suitable purpose. Also, the shaft extension 86 extends through a blower casing 89 for powering a blower such a conventional squirrel cage blower for discharging combustion products from the discharge end 90 of the blower. The center of the blower is communicated through the side wall 18 into the interior of the power compartment 28.

The other shaft 64 is provided with a bevel drive gear 92 thereon which drives a vertically disposed shaft 94 supported by bearings 96. The lower end of the shaft 94 is provided with a bevel gear 98 thereon which is in meshing engagement with a bevel drive gear 100 for a pressure pump 102 for pumping the coolant and sealant and the bevel gear 100 is in meshing engagement with a bevel gear 104 for driving a fuel pump 106. The fuel pump 106 is provided with a discharge conduit 108 and the sealant and coolant pump is provided with a discharge line 110. The intake for the fuel pump is in the form of a conduit 112 extending outwardly through a suitable fitting in the side wall 18 of the casing 12 for connection with a suitable fuel tank. The inlet from the sealant and coolant pump is designated by numeral 114 and extends into the opposite side of the casing for communication with a heat exchange radiator 116 which collects the heating and cooling liquid 118 from a sump formed by the bottom of the power compartment. The pump 102 will force the cooling and sealing liquid through the radiator and then discharge it to the conduit 110 for use in a manner described hereinafter. Meanwhile, the blower serves to pull air through the opening 32, through the radiator 116 through the opening 120 in the partition and thus discharge the heated air from the blower. When the air is pulled through the power compartment, the blower will also entrain or pick up the exhaust products thus discharging the exhaust products to the atmosphere.

During rotation of the ball assemblies 70 in relation to the power cylinder 36, both ball assemblies 70 will rotate in the same direction. For example, the ball assemblies will rotate in a clockwise direction as seen in FIGURE 4 while the cylinder 36 will rotate in a counterclockwise direction as viewed in FIGURE 3. Also, it is noted that the balls 78 in the ball assembly 70 are staggered in relation to the balls 84 in the ball assemblies 68 thus assuring that at least two balls are disposed in the cylinders at all times. In other words, balls 84 are disposed in the cylinder 54 when the balls 78 are exteriorly of the cylinder 36. As illustrated in FIGURE 7, balls 78 are in the cylinder 36 and the balls 84 are remote from the cylinder 54. This will assure a proper timed relationship to the balls and cylinders and assure that the balls and cylinders will be properly orientated and timed in relation to each other with there being absolutely no possibility of the balls and cylinders becoming orientated improperly in relation to each other.

The balls 84 act as a supercharger or compressor for incoming combustion supporting air and cooperating cylinder 54 includes transverse partitions 122 therein. The partitions 122 each include an aperture 124 closed by a check valve or plate 126 retained in place by a spring device 128. Thus, as the balls 84 move inwardly in the cylinder 54, the air entrapped in the cylinder 54 will be forced inwardly into the compartment 130 formed by the partitions 122. As the balls 84 move outwardly, the check valve 126 will be closed and a spring loaded check valve 132 will be opened against a spring 134 thus enabling combustion supporting air to be disposed between the partition 122 which in effect forms a cylinder head and the piston which is formed by the balls 84. Thus, as the balls 84 move back and forth alternately in the cylinder 54, air will be compressed into the compartment 130.

The area between the cylinders 36 and 54 is provided with a plurality of apertures 136 which communicates with the compartment 130 at the central area of the cylinder 54. The apertures 136 are closed by an arcuate plate 138 disposed interiorly of the cylinder 36. The plate 138 is retained in closed position by a valve stem 140 which has a polygonal or square portion 142 slidably received in a corresponding bore 144 between the cylinder 36 and the cylinder 54. This assures non-rotation of the arcuate valve 138 and orientates the valve in proper position.

The valve stem extends through the cylinder 54 and into the hollow interior 146 of the hollow shaft 56 and terminates in a threaded portion 148. The threaded portion 148 is provided with an adjustment nut 150 and a compression spring 152 disposed between the nut 150 and the bottom of the hollow interior 146 of the shaft 56 thus serving to retain the valve 138 in position. When the pressure in the interior of the cylinder 54 is greater than the pressure interiorly of the power cylinder 36, air will force the valve 138 open thus admitting a fresh supply of air. For example, when the balls 78 move away from each other and the balls 84 move toward each other and as the balls 78 move completely out of the cylinder 36, the balls 84 will compress air and force the valve member 138 off of its seat thus forcing a combustion supporting air charge into the cylinder 36 and forcing the exhaust products as well as the liquid sealant out of the ends of the freely rotating cylinder 36.

For supplying fuel and liquid coolant and sealant to the cylinder 36, reference is made specifically to FIGURES 7 and 8. In this construction, the details of the hollow shaft 40 are disclosed and the hollow shaft 40 is integral with or rigid with the cylinder 36 and includes a centrally disposed longitudinal passageway or bore 154 extending therethrough which has the outer end thereof enlarged into a pump chamber 156 having a plunger 158 reciprocal therein. The portion of the shaft 40 forming the chamber 156 is provided with a slot 160 for registry with an annular groove 162 formed in a stationary block 164 supported by a bracket 166 carried by the frame 34, see FIG. 10. The block 164 is connected with the fuel line 108 for supplying fuel into the chamber 156. The plunger 158 is provided with a looped or hollow end 168 which receives a cam 170 rigid with a shaft 172 which is rotatably supported on an adapter 174 attached to the end of the shaft 40. The shaft 172 is rigid with a bevel gear 176 in meshing engagement with a stationary bevel gear 178 attached to the block 164 by virtue of fastening bolts 180. Thus, as the shaft 40 rotates, this will cause rotation of the gear 176 as it rolls around gear 178 thus rotation of the shaft 172 and rotation of the cam 170 and reciprocation of the plunger 158 and an effective pumping of fuel into the interior of the cylinder 36 by having the fuel pass along passageway 156.

Disposed alongside of the block 164 on the bracket 166 is a block 182 and a block 184. The block 182 is provided with an annular groove or recess 186 and the block 184 is provided with an annular groove or recess 188. In each of the blocks 164, 182 and 188, there is a pair of O-ring seals 189 forming a seal for the respective grooves 162, 186 and 188. The cooling and sealing liquid conduit 110 is connected with a valve body 190 in the form of a three-way valve and this valve body 190 is provided with a pair of conduits 192 and 194. The conduit 192 is connected with the block 184 and communicated specifically with the groove 188. The shaft 40 is provided with a passageway 196 which in turn is connected with an adapter 198 having branch lines 200 extending therefrom. The branch lines 200 extend into the chamber 50 for discharging sealing liquid out through the apertures 52 at the proper timed interval. The other of the lines is connected with the block 182 and communicated with the groove 186 for flow of coolant liquid into a passageway 202 communicating with the water jacket 46 for circulating cooling liquid therethrough with it being pointed out that the cooling jacket is provided with a discharge aperture diametrically opposed to the inlet passage 202.

The valve body 190 is provided with a rotatable valve core 204 having a shaft 206 connected thereto and the shaft 206 extends outwardly of the side wall 18. The terminal end of the shaft 206 is provided with a knob 208 thereon having a pointer 210 which may be associated with graduations 212 for purposes of varying the quantity of sealant that is discharged into the cylinders each time the balls 78 enter the cylinder 36 thus varying the compression ratio by varying the unoccupied volume between the balls 78.

In operation, the device will be started by any suitable mechanism for providing initial rotation thereof. The ball assemblies all will rotate clockwise as viewed in FIGURE 3 and the rigidly interconnected cylinders 36 and 54 will rotate counterclockwise. The balls are machined so that they are slightly smaller but only slightly smaller than the cylinder. The balls on the power ball assemblies are staggered in relation to the balls on the scavenger ball assemblies thus assuring that at least two balls are engaged with one of the cylinders at all times thus maintaining proper timed relationship of the components. Taking into consideration FIGURE 3, and the manner of rotation previously described, the ball assemblies will continue to rotate in a clockwise direction until such time as the cylinder reaches substantially a horizontal position which is the condition illustrated in FIGURE 7. In this condition, the balls 78 are at their innermost positions in relation to the cylinder 36. At this position, the fuel supply is injected and ignited by compression ignition since the compression ratio may be in the neighborhood of 14 to 1 or higher which is sufficient to provide compression ignition. As the fuel is injected between the balls 78, the fuel will intermingle with the compressed air therein and will be ignited thus causing expansion and forcing of the balls 78 outwardly. The ignition takes place in such a manner that the expansion of the burning combustible mixture will be such that the cylinder 36 has just passed horizontal and the balls 78 have just passed their dead center position so that an upward force is exerted on the right hand ball 78 and a downward force is exerted on the lefthand ball as viewed in FIGURE 3 thus causing power to be exerted on the shaft which supports the ball assemblies for rotation in a clockwise manner as viewed in FIGURE 3. As the rotation of the ball assemblies continue, the balls 78 will move apart from each other and out of the cylinder 36. However, before movement of the center of the balls 78 outwardly of the cylinder, the center of the balls 84 will move into the cylinder 54 thus assuring proper timed relationship of the balls and cylinders.

As the balls 78 enter the cylinder 36, a supply of sealing liquid will be squirted through the apertures 52 directly into the path of the balls and directly onto the balls. This will provide a liquid seal peripherally of the ball in relation to the interior of the cyinder 36 and will also serve to form a flat head to the piston formed by the ball. In other words, due to the centrifugal force caused by the spinning of a cylinder about a transverse axis and due to the inward movement of the balls, the liquid injected in front of the balls will generally conform equally about the balls and fill that area between the balls except that the liquid will form substantially a flat surface which forms means for compressing the air in the cylinder and also means for receiving the force of the combustible mixture as it burns and expands.

This arrangement enables the orientation of the axis of the cylinder and the line of application of force to be directly in line with the piston and in direct line with the direction of movement of the balls as they move out of the cylinder. As the pistons move outwardly of the cylinder 36, the combustion products will be exhausted along with the liquid sealing material which will fall down by gravity into the sump and be collected and reused again. This is also true of the coolant which is discharged outwardly of the cylinder 36.

While the device is disclosed as an internal combustion engine, it is also capable of use as a power device for use as a compressor or as a pump for various liquids and the like. The minimum number of parts reduces the maintenance necessary and also the initial cost of the device may be retained at a minimum. By virtue of the engine being completely rotary in motion, the loss of power due to the stopping and starting of pistons have been eliminated and considerable friction has been eliminated which normally is created between the piston rings and the cylinder wall. The absence of the connecting rod bearings, wrist pins and the like also reduces friction, weight, and moving parts. The additional leverage of the radial arms and the consequent higher torque due to added length provides a high torque curve for the engine and the engine provides four power explosions for a revolution of the power shaft thus providing a smoother output of power.

Inasmuch as the exhaust gases are still expanding against the ball pistons after they leave the cylinder, additional thrust is gained for causing rotation of the ball assemblies and no power is wasted in restrictions caused by normally small exhaust valves such as occurs in conventional internal combustion engines.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An internal combustion engine comprising a cylinder open throughout its length, means supporting the cylinder for rotation on a generally centrally disposed transverse axis, a pair of ball assemblies disposed on opposite sides of the cylinder, means mounting the ball assemblies for rotation on axes parallel to the axis of rotation of the open ended cylinder, each ball assembly including a plurality of circumferentially spaced balls adapted to be received in the open end of the cylinder, said ball assemblies rotating in the same direction opposite to the direction of rotation of the cylinder whereby rotation of the ball assemblies and the cylinder will cause the ball assemblies to move into the cylinder to a position adjacent each other thereby forming a working chamber within the cylinder for compressing air, means for injecting fuel into the cylinder intermediate the balls when they are in their adjacent position whereby combustion of the fuel and air mixture within the cylinder will cause the balls to move outwardly of the cylinder for rotating the ball assemblies about their axes of rotation, and means interconnecting the ball assemblies and the open ended cylinder for retaining the cylinder and ball assemblies in properly timed relation.

2. An internal combustion engine comprising a cylinder open throughout its length, means supporting the cylinder for rotation on a generally centrally disposed transverse axis, a pair of ball assemblies disposed on opposite sides of the cylinder, means mounting the ball assemblies for rotation on axes parallel to the axis of rotation of the open ended cylinder, each ball assembly including a plurality of circumferentially spaced balls adapted to be received in the open end of the cylinder, said ball assemblies rotating in the same direction opposite to the direction of rotation of the cylinder whereby rotation of the ball assemblies and the cylinder will cause the ball assemblies to move into the cylinder to a position adjacent each other thereby forming a working chamber within the cylinder for compressing air, means for injecting fuel into the cylinder intermediate the balls when they are in their adjacent position whereby combustion of the fuel and air mixture within the cylinder will cause the balls to move outwardly of the cylinder for rotating the ball assemblies about their axes of rotation, and means interconnecting the ball assemblies and the open ended cylinder for retaining the cylinder and ball assemblies in properly timed relation, said means interconnecting the cylinder and ball assemblies including a scavenging open ended cylinder disposed in spaced relation to but rigid with the power cylinder for free rotation therewith, a pair of scavenging ball assemblies mounted for rotation about the same axes as the ball assemblies associated with the power cylinder, the scavenging ball assemblies being staggered in relation to the power ball assemblies thereby assuring that at least two balls are in registry with the cylinder at all times thereby retaining the ball assemblies in the cylinders in properly timed relation.

3. An internal combustion engine comprising a cylinder open throughout its length, means supporting the cylinder for rotation on a generally centrally disposed transverse axis, a pair of ball assemblies disposed on opposite sides of the cylinder, means mounting the ball assemblies for rotation on axes parallel to the axis of rotation of the open ended cylinder, each ball assembly including a plurality of circumferentially spaced balls adapted to be received in the open end of the cylinder, said ball assemblies rotating in the same direction opposite to the direction of rotation of the cylinder whereby rotation of the ball assemblies and the cylinder will cause the ball assemblies to move into the cylinder to a position adjacent each other thereby forming a working chamber within the cylinder for compressing air, means for injecting fuel into the cylinder intermediate the balls when they are in their adjacent position whereby combustion of the fuel and air mixture within the cylinder will cause the balls to move outwardly of the cylinder for rotating the ball assemblies about their axes of rotation, and means interconnecting the ball assemblies and the open ended cylinder for retaining the cylinder and ball assemblies in properly timed relation, means for injecting a sealing liquid into the outer ends of the cylinder as the balls pass into the cylinder thereby forming a liquid seal for the balls in relation to the cylinder and also forming a substantially flat head in front of the balls as they move inwardly whereby the forces of combustion will be exerted against the flat liquid head formed by the liquid sealant.

4. The structure as defined in claim 2 wherein said cylinder is provided with a jacket spaced circumferentially around the outside of the cylinder, and means circulating a coolant through the jacket for cooling the power cylinder.

5. The structure as defined in claim 2 wherein said scavenging cylinder is communicated with the power cylinder, said power cylinder including a series of centrally disposed openings, a spring loaded valve normally closing said openings but being openable by pressure exerted thereon from the scavenging cylinder whereby the valve will be automatically opened when the pressure in the power cylinder is reduced to a point below the pressure in the scavenging cylinder thereby thoroughly scavenging the open ended cylinder from the center of rotation thereof.

6. In a power device, a power transmitting assembly comprising a cylinder open throughout its length, means freely rotatably mounting the cylinder for rotation on a substantially centrally disposed transverse axis, a pair of ball assemblies mounted on opposite sides of the cylinder and mounted for rotation on axes parallel to the axis of rotation of the cylinder, each ball assembly including a plurality of radially extending arms with a spherical ball rigidly mounted on the outer end of each arm, said ball assemblies being rotatable in the same direction with respect to each other and in an opposite direction to the cylinder whereby the balls on the ends of the arms will enter and leave the cylinder during rotation of the ball assemblies and the cylinder whereby the space within the cylinder between the balls when they move toward and away from each other forms a working chamber which may be employed for pumping fluids or for receiving forces of expanding combustion products, and means interconnecting the ball assemblies and the open-ended cylinder for retaining the cylinder and ball assemblies in properly timed relation.

7. In a power device, a power transmitting assembly comprising an open ended cylinder, means freely rotatably mounting the cylinder for rotation on a substantially centrally disposed transverse axis, a pair of ball assemblies mounted on opposite sides of the cylinder and mounted for rotation on axes parallel to the axis of rotation of the cylinder, each ball assembly including a plurality of radially extending arms with a spherical ball rigidly mounted on the outer end of each arm, said ball assemblies being rotatable in the same direction with respect to each other and in an opposite direction to the cylinder whereby the balls on the ends of the arms will enter and leave the cylinder during rotation of the ball assemblies and the cylinder whereby the space within the cylinder between the balls when they move toward and away from each other forms a working chamber which may be employed for pumping fluids or for receiving forces of expanding combustion products, said cylinder being provided with a plurality of liquid inlet apertures adjacent each end thereof, means supplying liquid under pressure through said apertures as the balls begin to enter the cylinder thereby sealing the balls in relation to the cylinder and forming a flat inner surface for the piston formed by the ball whereby the power exerted on the balls will be exerted on substantially a flat surface, said sealing liquid being discharged from the open end of the cylinder as the balls leave the cylinder for gravity discharge into a sump for recirculation.

8. In an internal combustion engine, a power cylinder being open throughout its length and having a constant internal diameter, means supporting the cylinder for free rotation on a centrally disposed transverse axis, and means injecting fuel into the interior of the cylinder, said means extending concentrically with the means for freely rotatably supporting the cylinder, said means for injecting fuel including a pump cylinder, a cam operated plunger in said pump cylinder, said pump cylinder being communicated with a fuel supply for receiving a charge of fuel, said means supporting the cylinder including a passageway communicating the interior of the cylinder with the interior of the plunger for discharging a predetermined quantity of fuel into the cylinder, said open cylinder being provided with a jacket for receiving cooling liquid, and a plurality of apertures extending interiorly of the cylinder at each end thereof, a sealing fluid supply means, means for pressurizing the sealing fluid, and means for communicating the apertures in the ends of the cylinders with the pressure means at predetermined intervals for injecting sealing fluid into the cylinder immediately forwardly of the piston means entering the cylinder for forming a seal between the cylinder and such piston means, and means communicating the cooling jacket with the sealing fluid pressure whereby the sealing fluid will also cool the jacket around the cylinder.

9. The structure as defined in claim 8 together with means rigidly attached to the cylinder for supplying combustion supporting air therein, said means including a similar cylinder rigidly connected to the power cylinder in angular relation thereto, and means interconnecting the combustion supporting air cylinder and the power cylinder for flow of pressurized air into the power cylinder upon reduction of pressure in the power cylinder below that of the pressure in the air cylinder.

10. The structure as defined in claim 9 wherein each of the cylinders is provided with a pair of ball assemblies rotatably supported on axes parallel to, in alignment with and on opposite sides of the axis of rotation of the cylinders, said ball assemblies each including a plurality of balls mounted on radial arms for movement into and out of the cylinders in staggered relation whereby at least two of the balls will always be engaged with one of the cylinders.

11. The structure as defined in claim 10 wherein said balls have a diameter substantially equal to but slightly smaller than the internal diameter of the cylinders, said sealing liquid serving to seal the balls in relation to the power cylinder for providing a compression seal and for providing a flat surface upon which the combustion products impinge when expanding thereby causing the ball assemblies to rotate.

12. An internal combustion engine comprising a sleeve being open throughout its length and having a constant cross-sectional area, means supporting the sleeve for rotation on a centrally disposed transverse axis, a pair of ball assemblies disposed on opposite sides of the sleeve, means mounting the ball assemblies for rotation on axes parallel to the axis of rotation of the sleeve, each ball assembly including a plurality of radial arms disposed in angularly spaced rigid relation to each other, each arm having a spherical ball rigid with the outer end thereof for entering the open end of the sleeve, means for admitting a combustion mixture into the sleeve intermediate the balls when they are in their adjacent position whereby combustion of the fuel within the sleeve will cause the balls to move outwardly of the sleeve, and means for maintaining the ball assemblies and sleeve in timed relation to each other.

13. The structure as defined in claim 12 wherein said means maintaining the sleeve and ball assemblies in timed relation including a second sleeve connected rigidly to the first mentioned sleeve, a second pair of ball assemblies rigidly connected to the first mentioned pair of ball assemblies and associated with the second sleeve in the same manner, said second sleeve and ball assemblies serving to compress combustion supporting air for admission into the first mentioned sleeve.

14. The structure as defined in claim 12 together with sealing liquid inlet means disposed peripherally at the outer ends of said sleeve for introducing sealing liquid in front of the balls as they proceed sequentially into the sleeve for sealing the ball in relation to the sleeve.

References Cited in the file of this patent

UNITED STATES PATENTS

| 1,264,580 | Tacchi | Apr. 30, 1918 |
| 1,493,745 | Fischer | May 13, 1924 |
| 1,817,370 | Hammerstrom | Aug. 4, 1931 |
| 2,558,349 | Fette | June 26, 1951 |
| 2,792,259 | Shallenberg | May 14, 1957 |
| 2,831,433 | Siefert et al. | Apr. 22, 1958 |
| 2,996,054 | Lang | Aug. 15, 1961 |

FOREIGN PATENTS

| 337,833 | Great Britain | Aug. 10, 1929 |